April 7, 1959  J. C. DUDDY  2,881,238

STORAGE BATTERY ELECTRODE AND METHOD OF PRODUCTION

Filed Feb. 24, 1956

INVENTOR.
JOSEPH C. DUDDY
BY
ATTORNEY

United States Patent Office 2,881,238
Patented Apr. 7, 1959

2,881,238

STORAGE BATTERY ELECTRODE AND METHOD OF PRODUCTION

Joseph C. Duddy, Langhorne, Pa., assignor to The Electric Storage Battery Company, a corporation of New Jersey Application February 24, 1956, Serial No. 567,491

3 Claims. (Cl. 136—20)

The invention relates to improvements in electrodes for storage batteries of the alkaline type and also to the methods of production of such electrodes. More particularly the invention is concerned with improvements in positive electrodes for use in silver-zinc batteries containing an electrolyte of potassium hydroxide, and to the production of these electrodes.

In the past, silver-zinc secondary batteries, as exemplified by U.S. Patent No. 2,317,711, Andre, have been principally used in those applications which require high rates of discharge and relatively short periods of life. For this type of service the positive plates comprising silver oxide or peroxide in the charged condition and metallic silver in the discharged condition can be relatively thin and highly porous i.e. containing pores of such size and in such an amount that a maximum amount of surface area is immediately available for reaction with the electrolyte upon discharge. As a necessary corollary to this type of construction the positive plate have been relatively weak from the mechanical standpoint and, after a limited number of cycles of charge and discharge, they fail to give the desired capaicty. As conventionally made the positives have comprised either sintered silver powder produced from a dry mix, or a sintered plate containing some type of grid, such as a gauze or screen which has been pasted with a water mix of silver oxide and then sintered whereby the silver oxide is reduced to metallic silver. In either instance it has been found to be impractical to produce a plate which is mechanically strong enough for use in long life applications and yet porous enough to produce satisfactorily high rates of discharge. The reasons for this have been twofold, namely, (1) the inability to produce a sintered silver plate that is thick enough to have the desired mechanical strength without unwanted cracking caused by shrinkage during the sintering operation, and (2) lack of porosity i.e. available surface area, in the sintered plate arising from the aforementioned shrinkage or from an additional pressing operation designed to provide additional mechanical strength.

It is, therefore, an object of the invention to provide a mechanically strong and stable positive plate for use in silver-zinc batteries for use in services requiring extended battery life.

It is a further object of the invention to provide a plate as characterized above containing such a high degree of porosity as to permit discharges at rates heretofore produced only by relatively short lived batteries.

Another object of the invention is to provide new and improved procedures for the production of such plates.

Other objects of the invention will be apparent from the description and the claims that follow.

Figure 1:
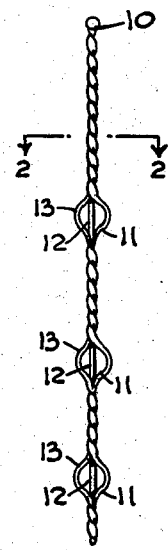
Figure 1 is an elevational view of a grid used in the construction of my new and improved plate.
Figure 2:
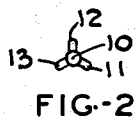
Figure 2 is a plan view taken along the lines 2—2 of Figure 1.

Referring now to the drawings in which like numerals are used to designate like parts, there is shown in Figure 1 a grid 10 comprising a plurality of wires twisted together. These wires preferably consist of silver but can, if desired, be formed of any electrically conductive substance which is not subject to attack by alkaline or oxidizing media and that will not set up an electrical couple with either silver or any oxide thereof. Grid 10 is provided at intervals with flights 11, 12 and 13 which are conveniently formed by untwisting the silver wires at various intervals along the length thereof. From a purely mechanical standpoint these flights serve the purpose of centering the grid within the heat decomposable sheath 14 which will be hereinafter described.

In the practice of the invention, grid 10 is inserted into sheath 14 which is preferably a sleeve of polyethylene that has been closed at the lower end thereof. It will be understood, of course, that the sheath can also be formed of polyvinyl chloride, polystyrene, or other thermoplastic resins or substances that are rapidly decomposable by thermal treatment at a temperature between about 700° C. and 900° C. The prime requisite of any material to be used as this sheath is that the products of decomposition thereof shall not react with metallic silver powder, that the thermal decomposition shall be an exothermic reaction and that the decomposition shall occur rapidly at a temperature substantially less than the melting point of the metal contained therein.

After insertion of grid 10 into sheath 14, free flowing powdered crystalline silver is sifted into said sheath as by a slight bumping or tapping operation. It has been found that the optimum density of silver powder is in the nature of 50 grams per cubic inch, it being understood, however, that densities of the powder in the nature of from 30 to 70 grams per square inch will be suitable for use in this process. The filled sheath is subjected to temperatures sufficiently high to decompose the sheath rapidly without reaching the melting point of the silver powder contained therein. If we assume the sheath to be made of polyethylene, or other similar thermoplastic resins, the range of 700° C. to 900° C. has been found to be satisfactory, the preferred ambient temperature being in the nature of 730° C., at which temperature the sheath will completely decompose in about 20 minutes. Upon subjection of the sheath to heat treatment at the elevated temperature, the polyethylene first melts and decomposes to a liquid which penetrates the pores of the enclosed silver particle mix. As the temperature of the sheath and the enclosed silver approaches the ambient temperature, further decomposition of the already partly decomposed resin particles progresses with exothermic formation of gaseous products.

The above described treatment results in a silver pencil or rod shaped body 15 in which the individual particles of silver have been sintered to each other as by a point to point fusion without appreciable reduction of the surface area of the individual particles or decrease in the high degree of porosity originally associated with the lightly packed metallic mix. The rod shaped body is characterized by a high degree of weld strength which is accounted for by the exothermic nature of the decomposition. The body is further characterized by freedom of cracks such being related to the degree of compaction of the original silver powder, it having been found as pointed out above that the optimum crack free and mechanically strong body results from a starting density of silver powder in the nature of 50 grams per cubic inch.

Figure 4:
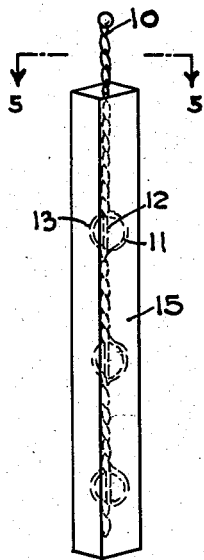
Figure 4 is an elevational view of a storage battery electrode produced in accordance with the invention.
Figure 3:
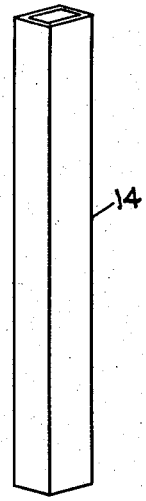
Figure 3 is a heat decomposable sheath which is a feature of the present invention.
Figure 5:
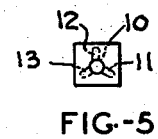
Figure 5 is a plan view taken along the lines 5—5 of Figure 4.

Figure 4 shows in elevation the completed electrode of the invention containing grid 10. It has been determined that in addition to the function of the flights of said grid in centering itself within sheath 14 and the resulting pencil 15, the design of grid bearing flights 11, 12 and 13 is also functional in that it provides by such flights preferential contact with the active material during expansion of such material during the charging process. Conversely, during discharge, as a result of which the active material shrinks, the centralized twisted portion serves as a contact area.

In the foregoing description there has been disclosed the method of production of a new and improved storage battery plate consisting of a porous silver rod-like body. For certain uses it may be desirable to provide plates having extremely high ampere hour capacity. In such cases, the rod-like body as shown in Figure 4 can be connected with other similar bodies to form a silver plate similar to the well known construction used in so called tubular type positive plates of lead acid storage batteries.

It will be seen, therefore, that the objects of the invention, namely, to provide a mechanically strong, highly porous electrolyte and to provide a new and improved method of producing the same have been accomplished.

The drawings and the description are intended to be exemplary only of the invention and other forms and variations coming within the scope of the appended claims will be apparent to those skilled in the art.

I claim:
1. A method of producing an electrode for silver-zinc batteries comprising the steps of supporting silver powder in a heat decomposable thermoplastic form, heating said form at a temperature above the decomposition point of said form and below the melting point of said silver powder to decompose said form and sinter said powder, and cooling the resulting sintered shape.

2. A method of producing an electrode for silver-zinc batteries comprising the steps of inserting a conducting grid into a heat decomposable thermoplastic resin sheath, surrounding said grid with silver powder, heating said sheath at a temperature of from 700° C. to 900° C. to rapidly decompose said sheath and sinter said silver powder, and cooling the resulting sintered shape.

3. The method of claim 2 in which said heat decomposable sheath consists of polyethylene.

References Cited in the file of this patent

UNITED STATES PATENTS

| | | |
|---|---|---|
| Re. 23,883 | Chubb | Oct. 5, 1954 |
| 403,451 | Barrett | May 14, 1889 |
| 2,026,193 | Smith | Dec. 31, 1935 |
| 2,305,121 | Wheat | Dec. 15, 1942 |
| 2,359,970 | Clark | Oct. 10, 1944 |
| 2,610,219 | Yardeny | Sept. 9, 1952 |
| 2,654,795 | Brill et al. | Oct. 6, 1953 |
| 2,818,462 | Solomon | Dec. 31, 1957 |

FOREIGN PATENTS

| | | |
|---|---|---|
| 444,381 | France | Aug. 6, 1912 |